(12) United States Patent
Hashiguchi et al.

(10) Patent No.: US 10,185,196 B2
(45) Date of Patent: Jan. 22, 2019

(54) LIQUID CRYSTAL DISPLAY PANEL AND LIQUID CRYSTAL DISPLAY DEVICE

(71) Applicant: Mitsubishi Electric Corporation, Tokyo (JP)

(72) Inventors: Takafumi Hashiguchi, Tokyo (JP); Naoya Hirata, Tokyo (JP); Tatsuya Baba, Tokyo (JP); Manabu Tanahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/888,579

(22) Filed: Feb. 5, 2018

(65) Prior Publication Data

US 2018/0246386 A1    Aug. 30, 2018

(30) Foreign Application Priority Data

Feb. 24, 2017  (JP) ................................ 2017-033359

(51) Int. Cl.
*G02F 1/1333* (2006.01)
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1368* (2013.01); *G02F 1/13439* (2013.01); *G02F 1/133345* (2013.01); *G02F 1/134309* (2013.01); *G02F 2001/134372* (2013.01); *G02F 2201/121* (2013.01); *G02F 2201/123* (2013.01)

(58) Field of Classification Search
CPC ......... G02F 2001/134372; G02F 2001/134381
See application file for complete search history.

(56) References Cited

U.S. PATENT DOCUMENTS

| | | | |
|---|---|---|---|
| 2002/0180920 A1 | 12/2002 | Noh et al. | |
| 2013/0222726 A1* | 8/2013 | Choi | G02F 1/133707 349/43 |
| 2014/0168552 A1 | 6/2014 | Jo et al. | |

FOREIGN PATENT DOCUMENTS

| | | |
|---|---|---|
| JP | H08-286202 A | 11/1996 |
| JP | H09-311341 A | 12/1997 |
| JP | 2003-021845 A | 1/2003 |
| JP | 2014-119746 A | 6/2014 |

* cited by examiner

*Primary Examiner* — Phu Vu
(74) *Attorney, Agent, or Firm* — Studebaker & Brackett PC

(57) ABSTRACT

Gate connection lines connected to gate wires in a display region are formed so as to have a region overlapped with source wires. According to such a structure, both of frame-width reduction and display performance of a liquid crystal display panel may be realized.

19 Claims, 12 Drawing Sheets

F I G. 8
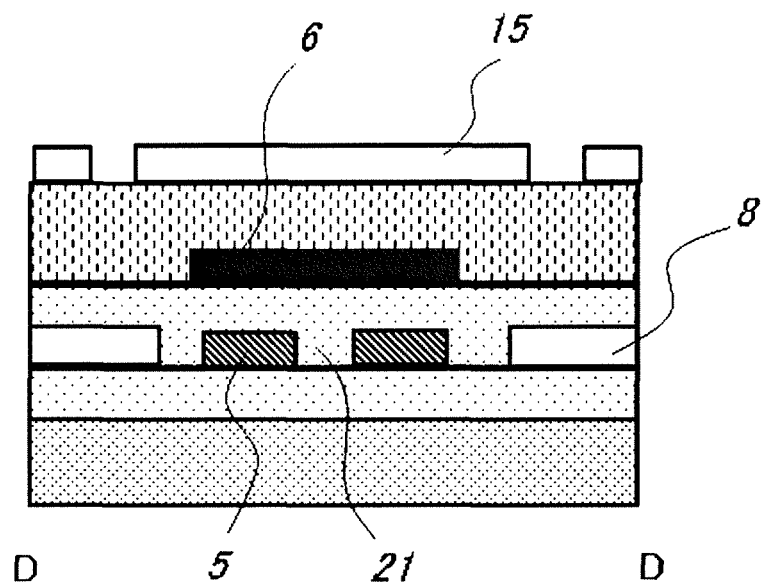

LIQUID CRYSTAL DISPLAY PANEL AND LIQUID CRYSTAL DISPLAY DEVICE

BACKGROUND OF THE INVENTION

Field of the Invention

The present invention relates to a liquid crystal display panel and a liquid crystal display device of a fringe field switching (FFS) mode.

Description of the Background Art

It has been a long time since new display devices have often been used, which include a display panel having a thin body and a planar shape through application of principals of liquid crystals, electroluminescence, and the like in place of a conventional cathode ray tube. A liquid crystal display device typifying such new display devices has characteristics in being capable of low voltage driving as well as having a thin body and light weight. The liquid crystal display device has a liquid crystal layer formed between two substrates. One of the substrates is an array substrate in which a plurality of pixels are arranged in a matrix pattern to form a display region. The other substrate is an opposing substrate in which color filters and the like are formed.

Particularly, in a liquid crystal display device of a thin film transistor (TFT) type, a TFT being a switching element is provided in each pixel on the array substrate, and each pixel is capable of independently retaining a voltage for driving the liquid crystal layer, thus enabling display of high image quality reduced in crosstalk. Further, in each pixel, a gate wire (scanning wire) for controlling on/off of the TFT and a source wire (signal wire) for inputting image data are provided. Normally, each pixel corresponds to a region surrounded by the gate wire and the source wire.

In recent liquid crystal display devices, a fringe field switching (FFS) mode having excellent viewing angle characteristics and high light transmittance has been proposed. A liquid crystal display device of an FFS mode performs display by applying a fringe electric field (oblique electric field containing both components of a horizontal electric field and a vertical electric field) to the liquid crystal layer. In the liquid crystal display device of an FFS mode, a transparent pixel electrode and a transparent common electrode are formed on the array substrate on one side, and the transparent pixel electrode and the transparent common electrode are vertically overlapped with intermediation of an insulating film. Normally, an electrode on a lower layer side is an electrode having a plate-like shape (in some cases having a shape of a plurality of branches) and an electrode on an upper layer side is an electrode having a plurality of gap portions serving as slits that are formed at substantially the same positions as the plate-like shape of the lower layer side, and the liquid crystals are controlled by an electric field from the electrode on the lower layer side through those slits. At this time, both of the pixel electrode and the common electrode are formed of transparent conductive films, thereby being capable of realizing high light transmittance.

Liquid crystal display devices of an FFS mode having such wide viewing angle characteristics and high transmittance as described above are developed into various applications. Among them, as a requirement focusing on a product design, frame-width reduction for reducing the width of a frame being a periphery of the display region is strongly required nowadays.

Those liquid crystal display devices include a liquid crystal display panel in which the plurality of pixels are arranged in a matrix pattern to form the display region. In a periphery of the display region in the liquid crystal display panel, there is provided a frame region having a region for mounting driver ICs that respectively output a gate signal and a source signal for driving liquid crystals to the gate wire and the source wire, and a region for forming routing wires for transmitting the signal from each driver IC to the gate wire and the source wire in the display region. The gate wire and the source wire intersect in the display region, and hence mounting portions for a gate IC and a source IC and the routing wires are formed on at least two sides of the display region, thereby being difficult to realize frame-width reduction.

Further, even when the gate IC and the source IC are formed on only one side, the routing wires need to be formed on another side except the one side, still being difficult to realize frame-width reduction (Japanese Patent Application Laid-Open No. 9-311341 (1997)). In view of the above, such a structure is proposed that reduces even the width of a part of a frame unused for IC mounting by collecting a mounting region into only one side and further forming gate routing wires for transmitting a gate signal in the display region (Japanese Patent Application Laid-Open No. 2014-119746).

However, when gate leading wires are formed in parallel to the source wires in the display region as in Japanese Patent Application Laid-Open No. 2014-119746, a region contributing to transmittance in the pixels is reduced, causing reduction in transmittance. Further, luminance of the backlight needs to be increased in order to compensate for reduction of luminance of a display device due to the reduction of transmittance, which may increase power consumption.

Further, as the size of the pixels is reduced owing to realization of high resolution of the pixels, lowering degree of transmittance due to the gate leading wires arranged so as to extend perpendicularly to the gate wire becomes more prominent. Particularly, in a case of the liquid crystal display device of an FFS mode, display is performed by applying a fringe electric field (oblique electric field containing both components of a horizontal electric field and a vertical electric field) to the liquid crystal layer, thus being liable to be affected by changes in electric field caused by wires in the periphery of the pixel electrode.

SUMMARY

An object is to provide a liquid crystal display panel that suppresses reduction in transmittance, reduces the size of a part of a frame unused for mounting, and has high designability, and a liquid crystal display device including such a liquid crystal display panel.

A liquid crystal display panel of an FFS mode according to the present invention includes a first substrate and a second substrate, liquid crystal, and a display region and a frame region. The first substrate and the second substrate are arranged so as to be opposed to each other. The liquid crystal is sealed between the first substrate and the second substrate. In the display region, an image is displayed. The frame region is a peripheral region of the display region. The first substrate includes an insulating substrate, a plurality of gate wires, a plurality of source wires, a first interlayer insulating film, a second interlayer insulating film, a switching element, a transparent pixel electrode, a transparent common electrode, a plurality of gate connection lines, and a connection portion. The plurality of gate wires are provided on the insulating substrate. The plurality of source wires are provided on the insulating substrate with intermediation of a first insulating film so as to intersect with the plurality of gate wires. The first interlayer insulating film is formed in an upper layer of the plurality of source wires. The second interlayer insulating film is formed in an upper layer of the first interlayer insulating film. The switching element is provided in a vicinity of an intersection position of one of the plurality of gate wires and one of the plurality of source wires. The transparent pixel electrode is connected to the switching element. The transparent common electrode is provided with intermediation of the first interlayer insulating film between the transparent common electrode and at least one of the plurality of source wires, and is provided with intermediation of the second interlayer insulating film between the transparent common electrode and the transparent pixel electrode and has a slit of the transparent common electrode. The plurality of gate connection lines are a different layer from the plurality of gate wires and the plurality of source wires. The plurality of gate connection lines extend while intersecting with the plurality of gate wires. A connection portion is provided in the display region. The connection portion electrically connects at least one of the plurality of gate wires and at least one of the plurality of gate connection lines. Each of the plurality of gate wires has the connection portion at least one position. At least one of the plurality of gate connection lines has a region overlapped with at least one of the plurality of source wires.

It is possible to provide a liquid crystal display device of an FFS mode capable of frame-width reduction without deteriorating display performance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a cross-sectional view of a portion taken along the line D-D in FIG. 7.

DESCRIPTION OF THE PREFERRED EMBODIMENTS

A. First Preferred Embodiment

<A-1. Configuration>

Figure 1:
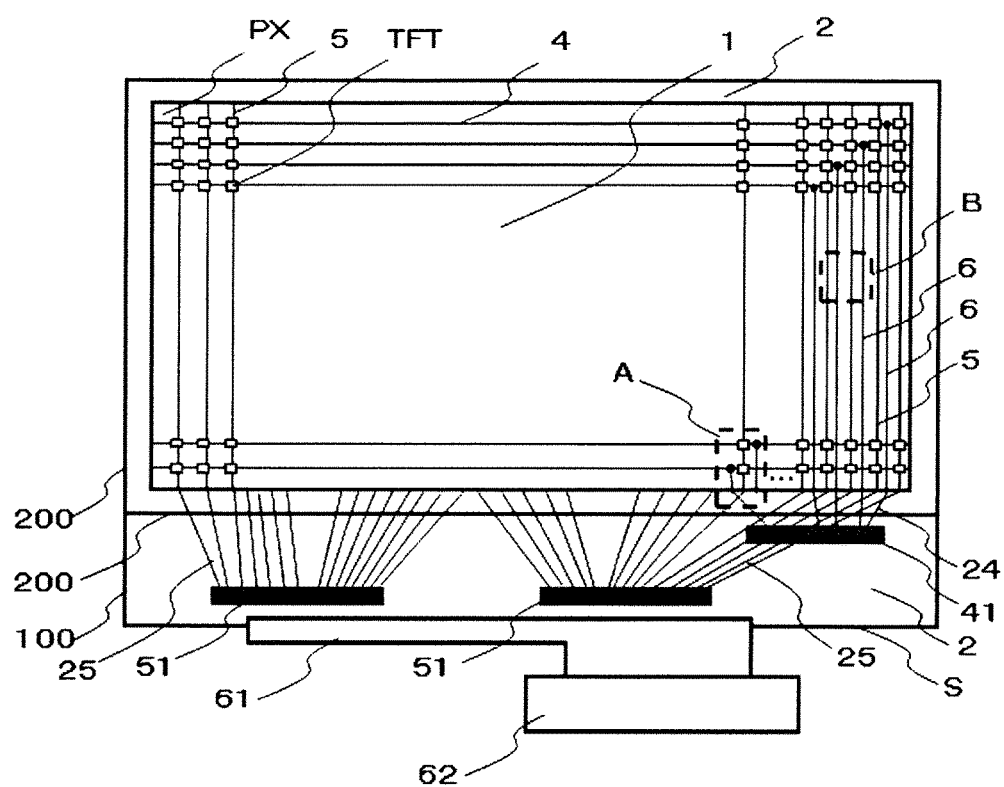
FIG. 1 is a plan view of a liquid crystal display panel according to a first preferred embodiment.

FIG. 1 is a plan view of a liquid crystal display panel according to a first preferred embodiment. As illustrated in FIG. 1, the liquid crystal display panel according to this first preferred embodiment includes a display region 1 corresponding to a display portion in which an image is displayed in a display device, and a frame region 2 being a periphery of the display region 1. In FIG. 1, a mode in which a TFT array substrate 100 and an opposing substrate 200 are overlapped is illustrated, and the opposing substrate 200 is overlapped at least with the display region 1. Although not shown, liquid crystals being an electro-optical material are sealed between both the substrates, which are sealed with a publicly-known method such as sealing so as not to allow the liquid crystals to be leaked. In the following description, components formed on the TFT array substrate 100 in FIG. 1 are mainly described.

Horizontal wires extending in a horizontal direction in the display region 1 in FIG. 1 are gate wires 4, and vertical wires extending in a vertical direction are source wires 5 and gate connection lines 6. In FIG. 1, the source wires 5 and the gate connection lines 6 are illustrated adjacently in parallel to each other for the sake of better understanding. However, both the wires are overlapped in this preferred embodiment as in later description. A region divided by intersection of the gate wire 4 and the source wire 5 is a pixel PX. In FIG. 1, the display region 1 and the frame region 2 are illustrated to be divided by one line for the sake of convenience. In actuality, however, such a boundary line is not necessarily provided, and it can be said that the display region 1 is a region in which the pixels PX are gathered.

Further, a thin film transistor TFT being a switching element is formed in the vicinity of the intersecting portion between the gate wire 4 and the source wire 5. The thin film transistor TFT turns on/off an image signal, thereby contributing to display of an image (also including a video) in the display region 1.

Although description is given later, each gate wire 4 is connected to the gate connection line 6 in the display region 1. Further, for the sake of the following description, a region including pixels in which the gate connection lines 6 are not formed in the display region 1 and partially including the frame region 2 is referred to as a region A, and a region including pixels in which the gate connection lines 6 are formed is referred to as a region B.

In the frame region 2, a gate IC 41 and source ICs 51 are mounted on one side S side that is parallel to an extending direction of the gate wires 4. In a liquid crystal display device, the gate IC 41 and the source ICs 51 are connected to a terminal (not shown) formed on the TFT array substrate 100 through COG mounting. Note that, the opposing substrate 200 is formed smaller than the TFT array substrate 100 so as to expose the frame region 2 on the side S side in which the gate IC 41 and the source ICs 51 are mounted. As for three sides other than the side S, end portions of the opposing substrate 200 and the TFT array substrate 100 are matched, but are not necessarily matched as long as the TFT array substrate 100 is larger.

Further, the gate IC 41 and the source ICs 51 are electrically connected to an FPC 61 being a flexible substrate through a wire (not shown). Further, the gate IC 41 and the source ICs 51 are also connected to a circuit board 62 via the FPC 61 being a flexible substrate. The liquid crystal display panel exchanges signals with the liquid crystal display device via the circuit board 62.

Further, on the TFT array substrate 100, gate routing lines 24 are formed between the gate IC 41 and the gate connection lines 6, and source routing lines 25 are formed between the source ICs 51 and the source wires 5. Those routing lines may be formed integrally and simultaneously with the respective gate connection lines 6 and source wires 5.

Next, signal paths are described. In the liquid crystal display device, a gate signal output from the gate IC 41 is transmitted to the gate wires 4 via the gate connection lines 6 in the display region 1 and the gate routing lines 24 in the frame region 2. Meanwhile, the source ICs 51 are connected to the source wires 5 via the source routing lines 25, and supply a voltage of an image signal to the source wires 5. That is, signal transmission into the display region 1 may be performed without requiring routing lines on sides other than the one side S side.

Note that, although not shown, the TFT array substrate 100 being a first substrate illustrated in FIG. 1 seals liquid crystals together in pairs with the opposing substrate being a second substrate in which color filters and the like are formed, thereby forming the liquid crystal display panel of an FFS mode. Further, the liquid crystal display panel and a driving member are connected, and the liquid crystal display panel is accommodated in a housing together with a backlight in which an optical sheet and a light source are mounted such that light from the light source is transmitted through a liquid crystal panel and the optical sheet. With this, the liquid crystal display device is completed.

Figure 2:
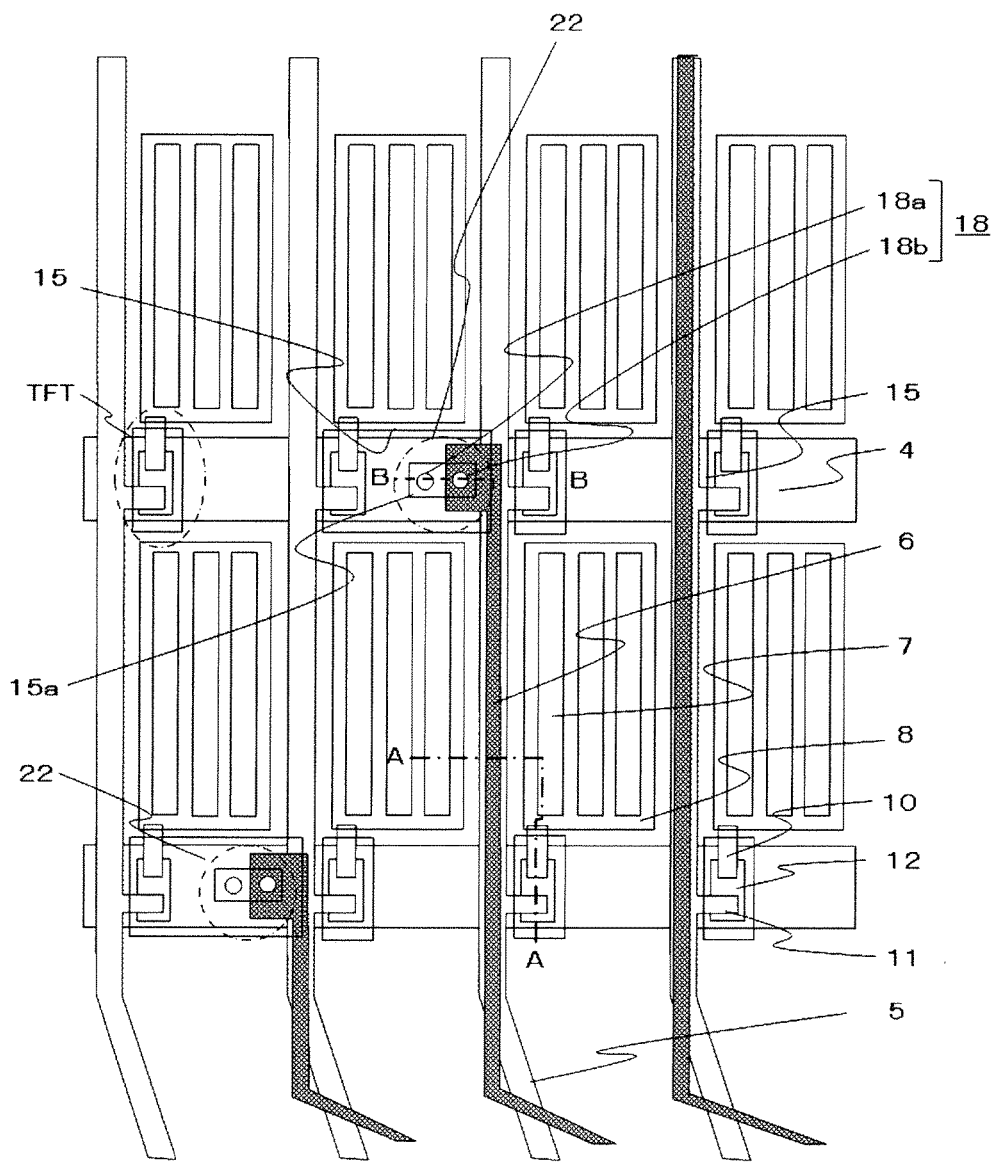
FIG. 2 is a plan view of FIG. 1.

FIG. 2 is a plan view illustrating patterns formed in the region A in the display region 1 of FIG. 1. Further, FIG. 3 is a cross-sectional view of a portion taken along the line A-A in FIG. 2, and FIG. 4 is a cross-sectional view of a portion taken along the line B-B in FIG. 2.

In FIG. 2, the source wires 5 and the gate connection lines 6 extending in the vertical direction have a region to be overlapped with each other, and intersect with the gate wires 4 extending in the horizontal direction. In FIG. 2, in order to facilitate illustration of the overlapping of both the wires, the gate connection lines 6 in an upper layer are illustrated slightly thinner, but both the wires may have the same width. Further, in FIG. 1 and FIG. 2, the gate wires 4 are illustrated so as to be orthogonal to the source wires 5 and the gate connection lines 6, but the gate wires 4 may intersect with the source wires 5 and the gate connection lines 6 obliquely. For example, such a mode may be employed that the source wire 5 being a vertical wire for forming a multi-domain structure has an obliquely bent portion.

In a pixel being a region divided by intersection of the gate wire 4 and the source wire 5, a slit 7 and a pixel electrode 8 of a common electrode 15 are formed across an entire surface. The details are described later referring also to FIG. 3. Further, connection portions 22 are illustrated as dotted circles in FIG. 2, which are not overlapped with the gate connection lines 6 and the source wires 5 but are overlapped with the gate connection lines 6 and the gate wires 4. The connection portions 22, as well as contact holes 18 in the connection portion 22, are described later referring also to FIG. 4.

Figure 3:
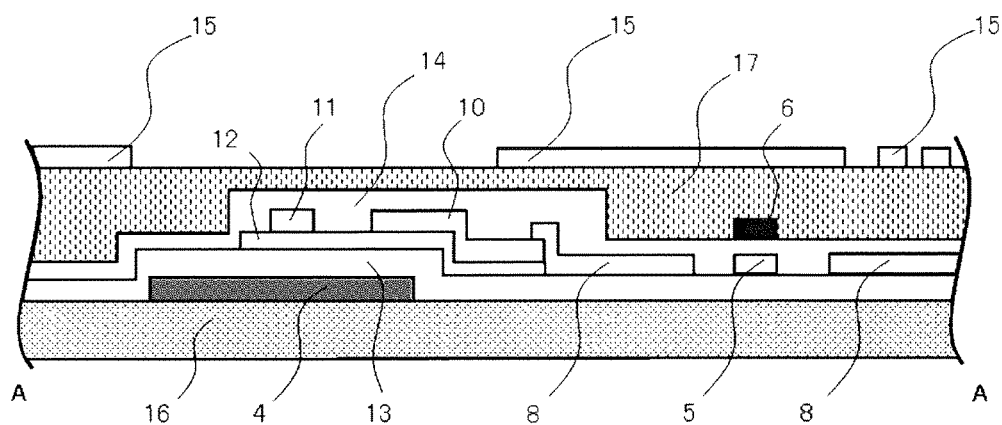
FIG. 3 is a cross-sectional view of a portion taken along the line A-A in FIG. 2.
Figure 4:
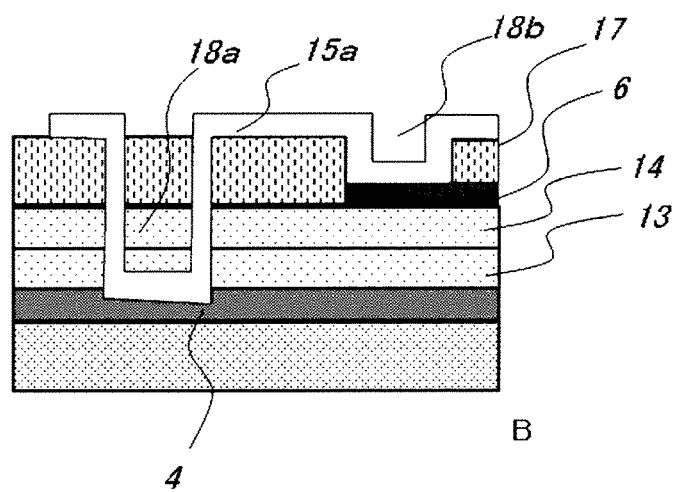
FIG. 4 is a cross-sectional view of a portion taken along the line B-B in FIG. 2.

Next, description is given referring also to FIG. 3 illustrating a cross-sectional view. The TFT array substrate 100 includes, as illustrated in FIG. 3, an insulating substrate 16, the gate wire 4, a gate insulating film 13, a channel layer 12, a source electrode 11, a drain electrode 10, the source wire 5, the pixel electrode 8, a first interlayer insulating film 14, the gate connection line 6, a second interlayer insulating film 17, and the common electrode 15. Although described later in description of a manufacturing method, those electrodes and wires are metallic films and transparent conductive films selected as appropriate, and the insulating film is a silicon nitride film, a silicon oxide film, a resin film, or the like, for example. Further, the channel layer 12 is generally formed of an a-Si film, but may be formed of, as other examples, a crystalline silicon film and an oxide semiconductor film such as In—Ga—Zn—O.

As the insulating substrate 16, a transparent substrate, such as a glass substrate and a quartz substrate, is used. On a surface of the insulating substrate 16, the gate wires 4 are provided. On the insulating substrate 16 including the gate wires 4, the gate insulating film 13 being a first insulating film is provided.

On the gate insulating film 13, the channel layer 12, the source electrode 11, and the pixel electrode 8 are provided. The channel layer 12 is positioned so as to be overlapped with a part of the gate wire 4 with intermediation of the gate insulating film 13. The source electrode 11 branched from the source wires 5 is provided on the channel layer 12. The drain electrode 10 is provided over the channel layer 12 and the gate insulating film 13. With this, a thin film transistor of an inverted staggered structure as a switching element is formed.

The pixel electrode 8 also being a transparent pixel electrode is formed on the drain electrode 10, and is connected also electrically to the drain electrode 10. In FIG. 2, the pixel electrode 8 is illustrated as a rectangular shape, and a part of the pixel electrode 8 is provided also over the gate insulating film 13 in which the drain electrode 10 is not formed, thus occupying most part of one pixel.

The first interlayer insulating film 14 is provided on the gate insulating film 13, the pixel electrode 8, the channel layer 12, the source electrode 11, the drain electrode 10, and the source wires 5. The gate connection lines 6 are formed on the first interlayer insulating film 14. As illustrated also in FIG. 2, the gate connection lines 6 are formed so as to be overlapped with the source wires 5. Further, as illustrated in FIG. 3, the gate connection lines 6 and the source wires 5 are insulated from each other with intermediation of the first interlayer insulating film 14. Therefore, in this first preferred embodiment, the gate connection lines 6 are provided in the display region 1, and thus an aperture ratio of a pixel is not reduced.

The second interlayer insulating film 17 is provided on the first interlayer insulating film 14 and the gate connection lines 6. Further, the common electrode 15 also being a transparent common electrode is formed on the second interlayer insulating film 17.

Referring to FIG. 2 and FIG. 3, the common electrode 15 is formed in an entire surface of the display region 1 except for the slit 7, the connection portion 22, and the vicinity of the thin film transistor. Accordingly, in FIG. 2, the common electrode 15 also covers the top of the source wires 5 with intermediation of the first interlayer insulating film 14 and the second interlayer insulating film 17. In this manner, according to a structure in which the common electrode 15 covers components in an upper layer with respect to the source wires 5, an effect of suppressing application of unwanted electric fields to liquid crystals from the source wires 5 is attained. Further, FIG. 2 is an illustration of a mode in which the common electrode 15 is not formed in a rectangular region extending over the connection portion 22 and the thin film transistor TFT adjacent to the connection portion. However, a region in which the common electrode 15 is not formed may be divided separately.

Referring to FIG. 2 and FIG. 3, the pixel electrode 8 and the common electrode 15 are insulated from and overlapped with each other with intermediation of the first interlayer insulating film 14 and the second interlayer insulating film 17, and particularly at least a part of the slit 7 is overlapped with the pixel electrode 8. Therefore, liquid crystal molecules are driven by a fringe electric field generated between the common electrode 15 and the pixel electrode 8 in the vicinity of the slit 7, thereby displaying an image. Further, storage capacity for stabilizing a pixel potential is formed between the pixel electrode 8 and the common electrode 15. Further, in FIG. 2, the pixel electrode 8 is illustrated as a rectangular shape, and slits are not formed in the pixel electrode 8. However, slits may be provided separately in a region overlapping the common electrode 15.

Next, the connection portion 22 is described referring to FIG. 2 and FIG. 4. In FIG. 4, a contact hole 18a being a first contact hole is opened in the gate insulating film 13, the first interlayer insulating film 14, and the second interlayer insulating film 17 on the gate wires 4. Similarly, a contact hole 18b being a second contact hole is opened in the second interlayer insulating film 17 on the gate connection lines 6. A connection film 15a is formed on the second interlayer insulating film 17 in a manner of covering the contact holes 18a and 18b.

The connection portion 22 is a structure of connecting the gate wires 4 and the gate connection lines 6. In FIG. 4, however, a structure in which the connection film 15a electrically connects the gate wires 4 and the gate connection lines 6 through the contact holes 18a and 18b is illustrated. In the structure illustrated in FIG. 4, a gate potential is applied also to the connection film 15a.

The connection film 15a may be formed simultaneously with the common electrode 15 using the same material, but the connection film 15a needs to be electrically insulated from the common electrode 15 in that case. For example, the connection film 15a and the common electrode 15 may be formed simultaneously as individually separated patterns. Alternatively, the connection film 15a may be formed separately using a material different from the common electrode 15. Further, the common electrode 15 and the connection film 15a may be directly connected without intermediation of the connection film 15a in this preferred embodiment, but this mode is described later.

Further, the second contact hole 18b is disposed on the gate wires 4 in FIG. 2 and FIG. 4, and hence reduction of an aperture ratio of light transmittance in a pixel can be suppressed. However, in a case where an aperture ratio of a pixel is not an issue, the second contact hole 18b may be disposed at a position different from the position on the gate wires 4. In this case, the gate connection lines 6 have a region extending beyond the region overlapped with the gate wires 4.

The connection portion 22 described herein is, as illustrated in FIG. 2, provided at at least one position in each gate wire 4, and each gate wire 4 is connected also electrically to the gate connection lines 6 at the position. Further, in FIG. 2, each gate connection line 6 extends from the frame region 2 to reach the connection portion 22, not extending further than the connection portion 22. Therefore, each gate connection line 6 has an unequal length in FIG. 2. The gate connection lines 6 may be extended further than the connection portion 22. In a case where the gate connection lines 6 and the source wires 5 are overlapped with each other in such a manner, however, capacity between the gate connection lines 6 and the source wires 5 is increased, which may cause display failure. Therefore, a mode as illustrated in FIG. 2 is adopted.

In this case, the length of each of the gate connection lines in the display region is different. Here, assuming a case where the gate connection lines 6 and the source wires 5 are not overlapped with each other but are disposed in parallel to each other unlike this preferred embodiment, such unevenness in the length of the gate connection lines 6 may lead to unevenness in an aperture ratio. However, in this preferred embodiment, a region in which the gate connection lines 6 and the source wires 5 are overlapped with each other is provided, and hence it is possible to reduce influence of unevenness in an aperture ratio, and in a case where the gate connection lines 6 are overlapped completely within a region in which the source wires 5 are disposed, it is possible to even eliminate such influence.

Note that, although not shown in FIG. 2, one gate wire 4 may be connected to a plurality of the gate connection lines 6 through a plurality of the connection portions 22. In that case, in a horizontal scanning period of the gate wire 4, an equal gate potential is applied to the connected plurality of gate connection lines 6 to be transmitted to the gate wire 4. Under a state in which the display region 1 has a region of long gate connection lines 6 and a region of short gate connection lines 6, this is an effective mode when difference in wiring resistance to each of the regions is desired to be reduced by connecting only the gate wire 4 in the region of long gate connection lines 6 to a plurality of gate connection lines 6. In this preferred embodiment, the gate wire 4 in the region of long gate connection lines 6 may also be mentioned as a gate wire 4 in a region far from the side S on which the gate IC 41 is mounted.

According to the configuration described above, in this first preferred embodiment, the gate connection lines 6 and other routing wires need not be arranged in the frame region 2 in the periphery of the display region 1, and hence it is possible to reduce the width of the frame region 2 without depending on resolution.

Further, the gate connection lines 6 arranged in the display region 1 are formed on the source wires 5 so as to be overlapped therewith, and hence transmittance equivalent to that of the related art can be secured without decreasing the slit 7. That is, according to this first preferred embodiment, a liquid crystal display device of an FFS mode capable of frame-width reduction independent of resolution can be realized without deteriorating display performance.

<A-2. Manufacturing Process>

Next, a manufacturing process of the TFT array substrate 100 illustrated in FIG. 2 and FIG. 3 is described. First, a first metal film to be the gate wires 4 is formed on the insulating substrate 16 with a sputtering method using a DC magnetron. It suffices that the first metal film be formed of Mo, Cr, W, Al, or Ta, or an alloy film having such metals as its main component. Then, patterning is performed to obtain the gate wires 4. Next, the gate insulating film 13 is formed with a plasma CVD method. A silicon nitride film is generally used as the gate insulating film 13, but a silicone oxide film, a silicon oxynitride film, and the like may be used.

After forming the gate insulating film 13, an a-Si film (amorphous silicon film) is formed with a plasma CVD method. The a-Si film generally has a stacking structure of an intrinsic semiconductor layer forming the channel layer 12 and an impurity semiconductor layer containing phosphorus and the like. The impurity semiconductor layer is provided for the purpose of securing an ohmic contact with the source electrode 11 and the drain electrode 10 to be described later. Then, patterning is performed to obtain the channel layer 12 as an island-shaped a-Si film.

Next, a second metal film is formed with a sputtering method using a DC magnetron. It suffices that the second metal film be formed of Mo, Cr, W, Al, or Ta, or an alloy film having such metals as its main component. Then, patterning is performed to obtain the source electrode 11, the drain electrode 10, and the source wires 5. Here, the impurity semiconductor layer provided for the purpose of obtaining an ohmic contact with the source electrode 11 and the drain electrode 10 may be in some cases subjected to etching using the source electrode 11 and the drain electrode 10 as masks in order to reduce masking man-hours.

After forming the source electrode 11, the drain electrode 10, and the source wires 5, a first transparent conductive film to be the pixel electrode 8 is formed with a sputtering method using a DC magnetron. The first transparent conductive film may be formed of ITO, indium zinc oxide (IZO), or the like. Then, patterning is performed to obtain the transparent pixel electrode 8.

After forming the pixel electrode 8, the first interlayer insulating film 14 is formed with a plasma CVD method. The first interlayer insulating film 14 may be formed of a silicon nitride film, a silicone oxide film, a silicon oxynitride film, or the like. Alternatively, in order to secure insulation property by thickening a film, the first interlayer insulating film 14 may be formed through application of an acrylic or imide-based organic resin film. Further, the first interlayer insulating film 14 may be formed by stacking a silicon nitride film, a silicone oxide film, or a silicon oxynitride film, and an organic resin film.

Next, a third metal film is formed with a sputtering method using a DC magnetron. It suffices that the third metal film be formed of Mo, Cr, W, Al, or Ta, or an alloy film having such metals as its main component. Then, patterning is performed to obtain the gate connection lines 6.

Then, the second interlayer insulating film 17 is formed with a plasma CVD method. The second interlayer insulating film 17 may be formed of a silicon nitride film, a silicone oxide film, a silicon oxynitride film, or the like. Alternatively, in order to further secure insulation property by thickening a film, the second interlayer insulating film 17 may be formed through application of an acrylic or imide-based organic resin film so as to have a thickness of from 1 μm to 3 μm. Further, the second interlayer insulating film 17 may be formed by stacking a silicon nitride film, a silicone oxide film, or a silicon oxynitride film, and an organic resin film.

Then, in order to secure conduction to the first metal film, the second metal film, the third metal film, or the first transparent conductive film, a contact hole (not shown) is formed.

After forming the contact hole, a second transparent conductive film to be the common electrode 15 is formed. The second transparent conductive film may be formed of ITO, IZO, or the like. Then, patterning is performed to obtain the common electrode 15. At the time of the patterning, the slit 7 is formed in the common electrode 15 on the pixel electrode 8.

B. Second Preferred Embodiment

Figure 5:
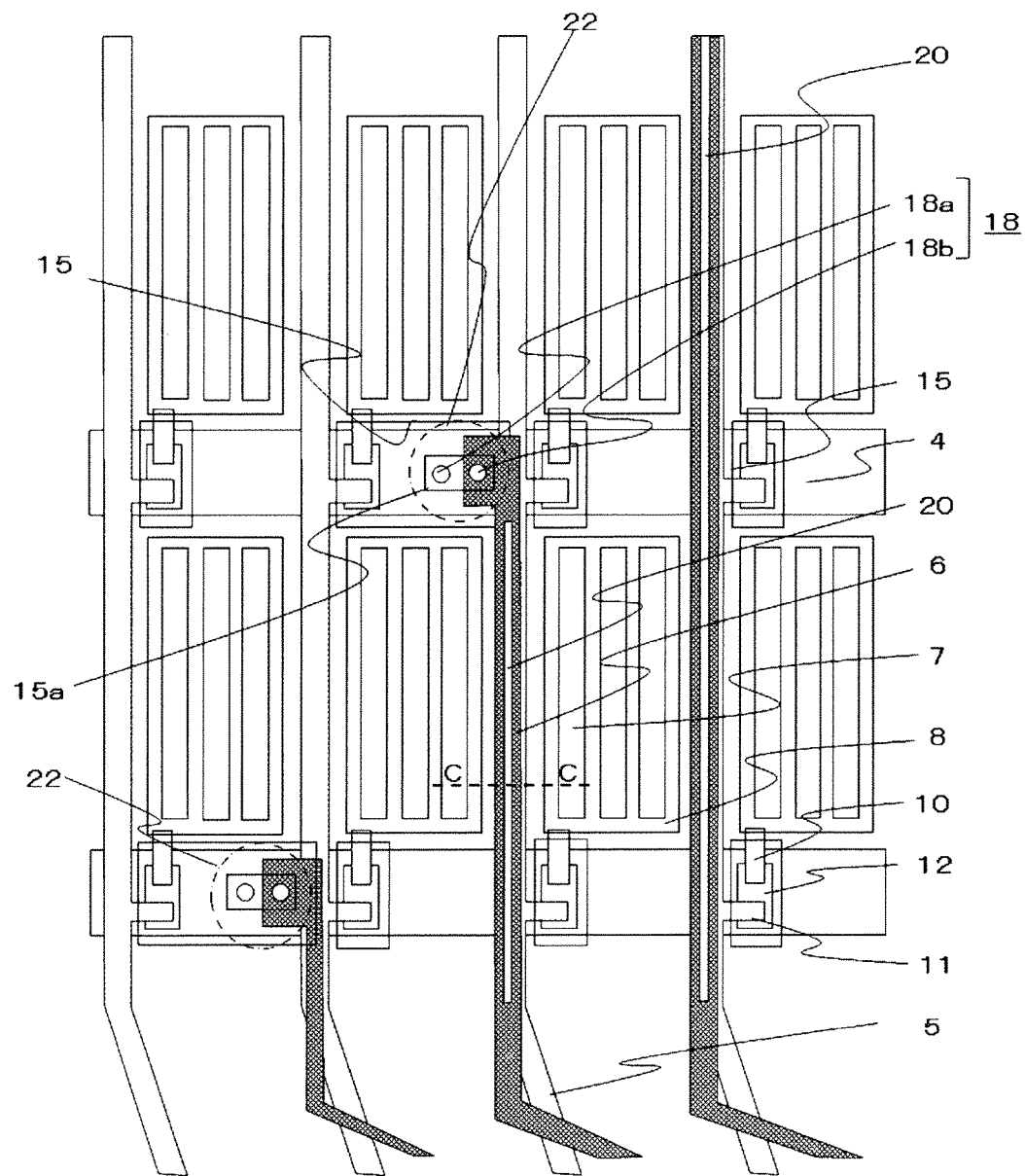
FIG. 5 is a plan view of a liquid crystal display panel according to a second preferred embodiment.
Figure 6:
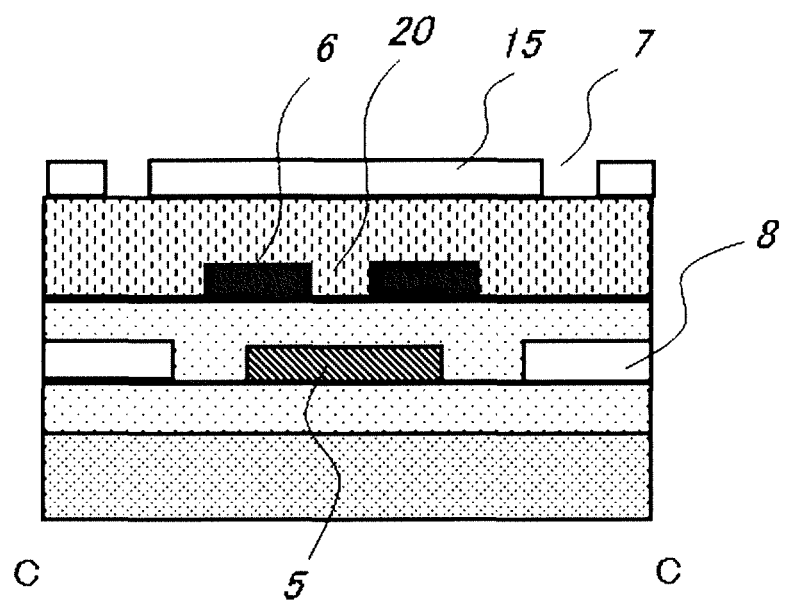
FIG. 6 is a cross-sectional view of a portion taken along the line C-C in FIG. 5.

FIG. 5 is a plan view according to a second preferred embodiment, which corresponds to an enlarged plan view of the region A of FIG. 1. Further, FIG. 6 is a cross-sectional view of a portion taken along the line C-C in FIG. 5. Note that, for the sake of avoiding redundancy due to repeated description, components having the same or corresponding functions are denoted by the same reference symbols in the drawings for each of the preferred embodiments.

In the second preferred embodiment, gate connection line slits 20 are provided in the gate connection lines 6 formed on the source wires 5. The gate connection line slits 20 are regions in which the gate connection lines 6 are not formed. Further, the gate connection line slits 20 are formed up to the vicinity of the contact hole 18 electrically connected to the gate wires 4.

As illustrated in the cross-sectional view of FIG. 6 which is taken along the line C-C, the gate connection lines 6 are formed on the first interlayer insulating film 14, and the gate connection line slits 20 are formed so as to have a region overlapped with the source wires 6. Provision of the gate connection line slits 20 reduces an area in which the source wires 5 and the gate connection lines 6 are overlapped with each other, thereby being capable of reducing capacity to be formed by the source wires 5 and the gate connection lines 6.

Further, in a case where the width of the gate connection lines 6 is increased to be larger than the width of the source wires 5 by providing the gate connection line slits 20, such a state may be assumed that transmittance of the pixel is reduced. Even in such a case, however, reduction of transmittance can be suppressed by suppressing the width of the gate connection lines 6 to such an extent as not to be overlapped with the slit 7.

According to the above-mentioned description, capacity formed by the gate connection lines 6 and the source wires 5 can be reduced, and hence delay in a source signal can be improved, and a liquid crystal display device of an FFS mode capable of frame-width reduction even in a high-resolution and large-screen liquid crystal display panel can be realized.

In the present invention, the preferred embodiments may be modified and omitted as appropriate within the scope of the invention. When coatability of the gate connection lines 6 crossing over the gate wires 4 is satisfactory, the gate wires 4 and the gate connection line slits 20 may intersect with each other.

C. Third Preferred Embodiment

Figure 7:
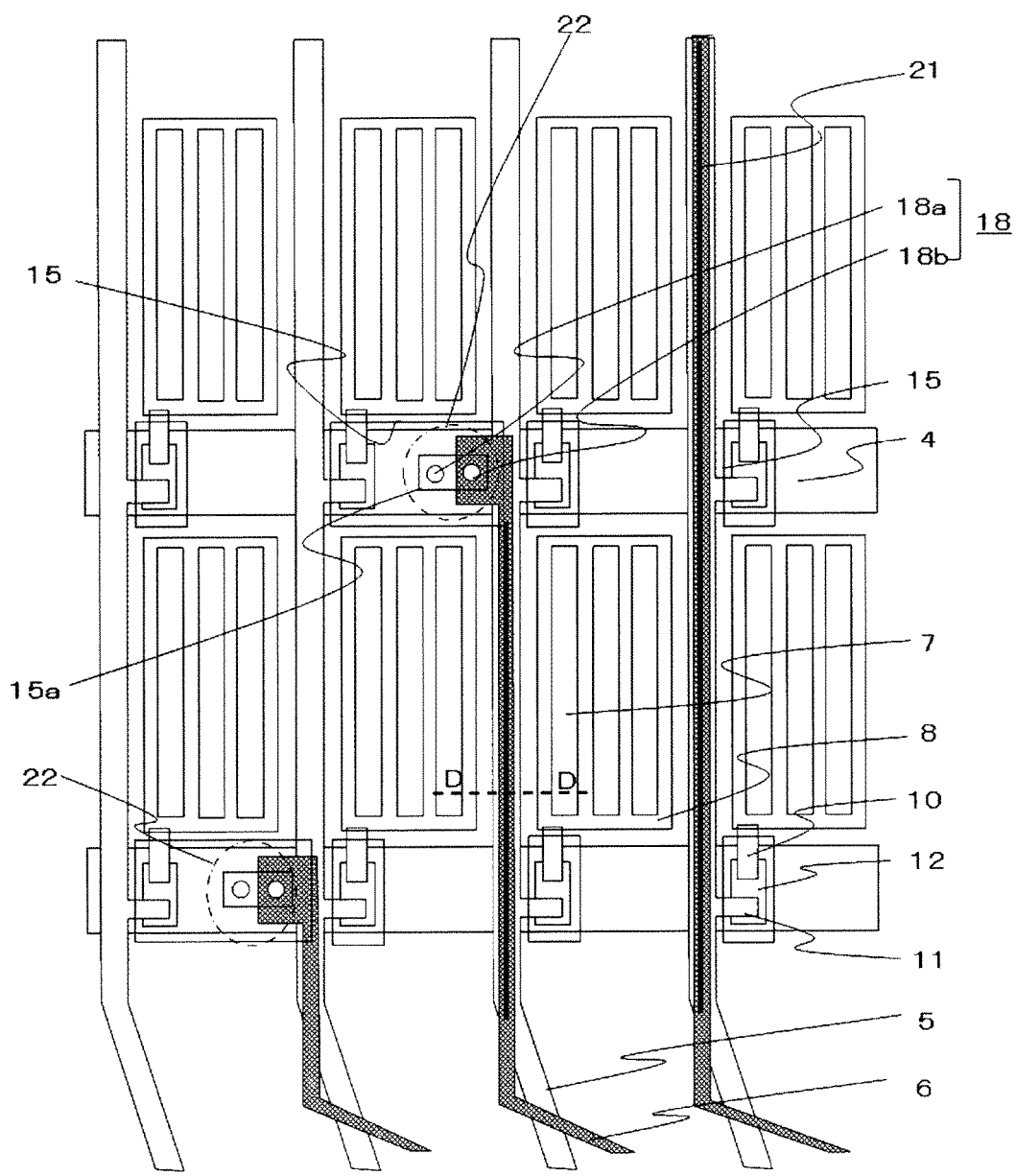
FIG. 7 is a plan view of a liquid crystal display panel according to a third preferred embodiment.

FIG. 7 is a plan view according to a third preferred embodiment, which corresponds to an enlarged plan view of the region A of FIG. 1. FIG. 8 is a cross-sectional view of a portion taken along the line D-D in FIG. 7. Note that, for the sake of avoiding redundancy due to repeated description, components having the same or corresponding functions are denoted by the same reference symbols in the drawings for each of the preferred embodiments.

The third preferred embodiment has its feature in that source wire slits 21 are provided in the source wires 5 formed in a lower layer of the gate connection lines 6. The source wire slits 21 are regions in which the source wires 5 are not formed, which are normally invisible behind the gate connection lines 6 in a plan view but are indicated by the black lines in the FIG. 7. As illustrated in FIG. 7 and FIG. 8, the source wire slit 21 is formed in a manner of hollowing out a central portion of the source wire 5 between one gate wire 4 and another gate wire 4 on the next stage. That is, the source wire slits 21 are formed so as to have a region overlapped with the gate connection lines 6. Therefore, an area in which the gate connection lines 6 and the source wires 5 are overlapped with each other is reduced.

With this, similarly to the second preferred embodiment, capacity formed between the source wires 5 and the gate connection lines 6 can be reduced, and hence delay in a source signal can be improved, and frame-width reduction can be realized even in a high-resolution and large-screen liquid crystal display panel.

In the present invention, the preferred embodiments may be modified and omitted as appropriate within the scope of the invention. For example, the source wire slits 21 need not be formed in a manner of hollowing out the central portion of the source wires 5, but may be formed in a manner of cutting out only one side. Further, when coatability of the source wires 5 crossing over the gate wires 4 is satisfactory, the gate wires 4 and the source wire slits 21 may intersect with each other.

D. Fourth Preferred Embodiment

Figure 9:
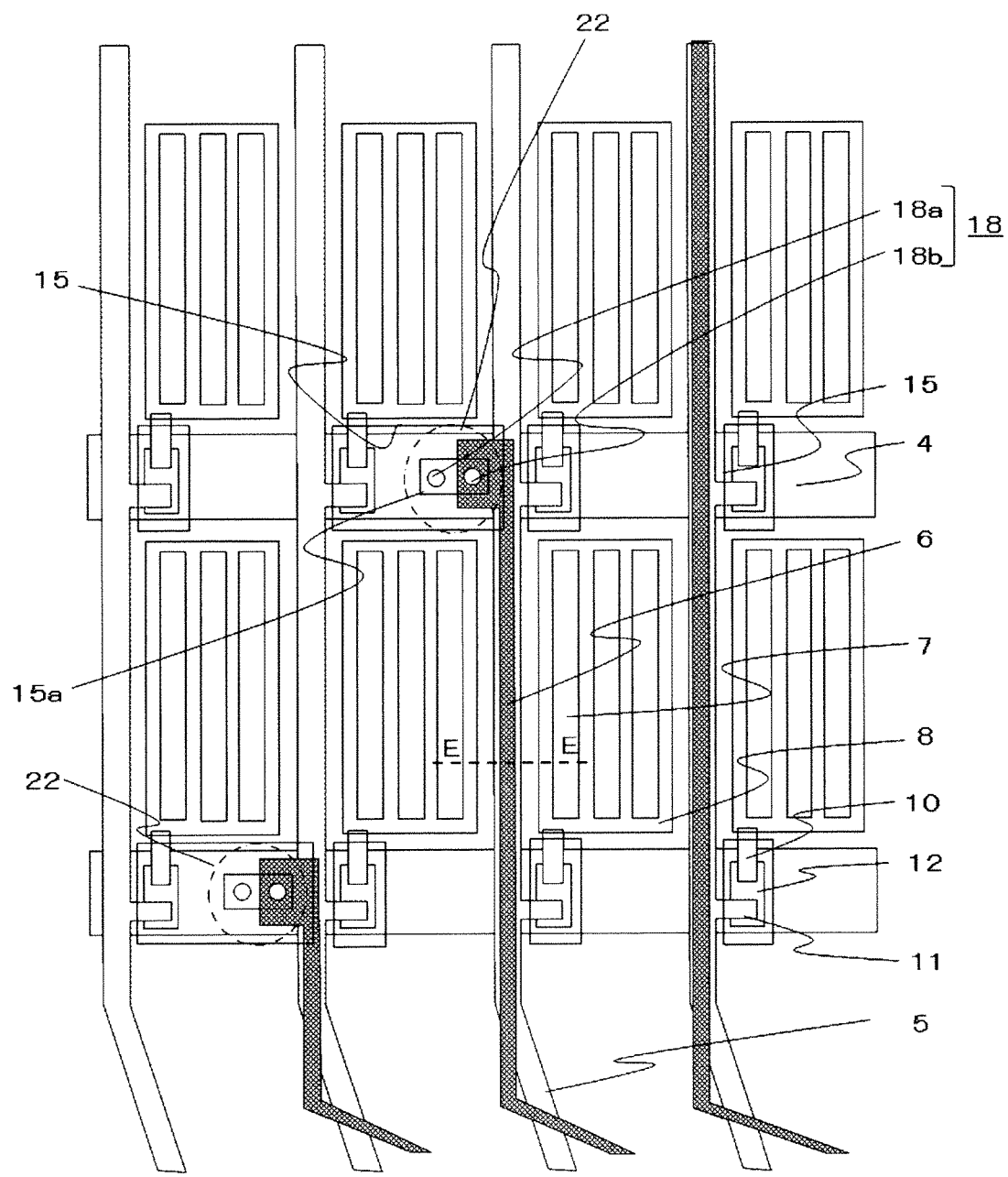
FIG. 9 is a plan view of a liquid crystal display panel according to a fourth preferred embodiment.
Figure 10:
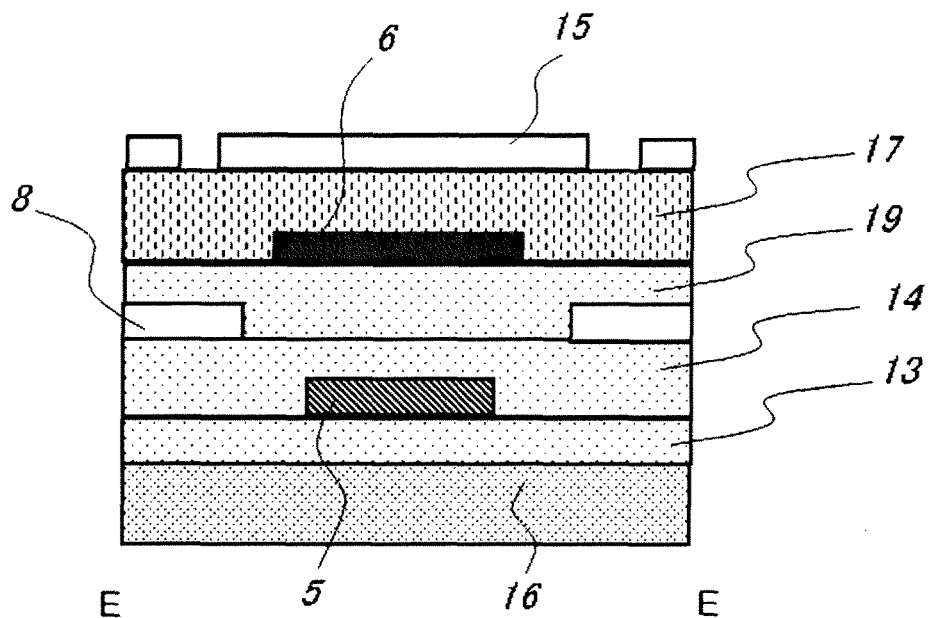
FIG. 10 is a cross-sectional view of a portion taken along the line E-E in FIG. 9.

FIG. 9 is a plan view according to a fourth preferred embodiment, which corresponds to an enlarged plan view of the region A of FIG. 1. FIG. 10 is a cross-sectional view of a portion taken along the line E-E in FIG. 9. Note that, for the sake of avoiding redundancy due to repeated description, components having the same or corresponding functions are denoted by the same reference symbols in the drawings for each of the preferred embodiments. Further, the gist of the fourth preferred embodiment lies mainly in a relationship between layers, and therefore FIG. 9 illustrating a plan view is substantially the same as FIG. 2 of the first preferred embodiment in appearance.

In the fourth preferred embodiment, the pixel electrode 8 is formed on the first interlayer insulating film 14, a third interlayer insulating film 19 is further stacked on the pixel electrode 8, and the gate connection lines 6 are provided on the third interlayer insulating film 19. Between the source wires 5 and the gate connection lines 6, insulating films in which the first interlayer insulating film 14 and the third interlayer insulating film 19 are stacked are formed, and hence capacity between the source wires 5 and the gate connection lines 6 is reduced. Further, between the source wires 5 and the gate connection lines 6, insulating films in at least two layers including the first interlayer insulating film 14 are stacked, and hence a short circuit failure between wires which is caused by a foreign substance and a defect in an insulating film can be suppressed, and enhancement in yield rate can be expected.

According to the above-mentioned structure, similarly to the first preferred embodiment, frame-width reduction can be realized in a high-resolution large screen, and a liquid crystal display device of an FFS mode can be manufactured with a high yield rate.

In the present invention, the preferred embodiments may be modified and omitted as appropriate within the scope of the invention. For example, similar effects may be attained even when slits are provided in the gate connection lines 6 or the source wires 5 as in the second or third preferred embodiment.

E. Fifth Preferred Embodiment

<E-1. Configuration>

Figure 11:
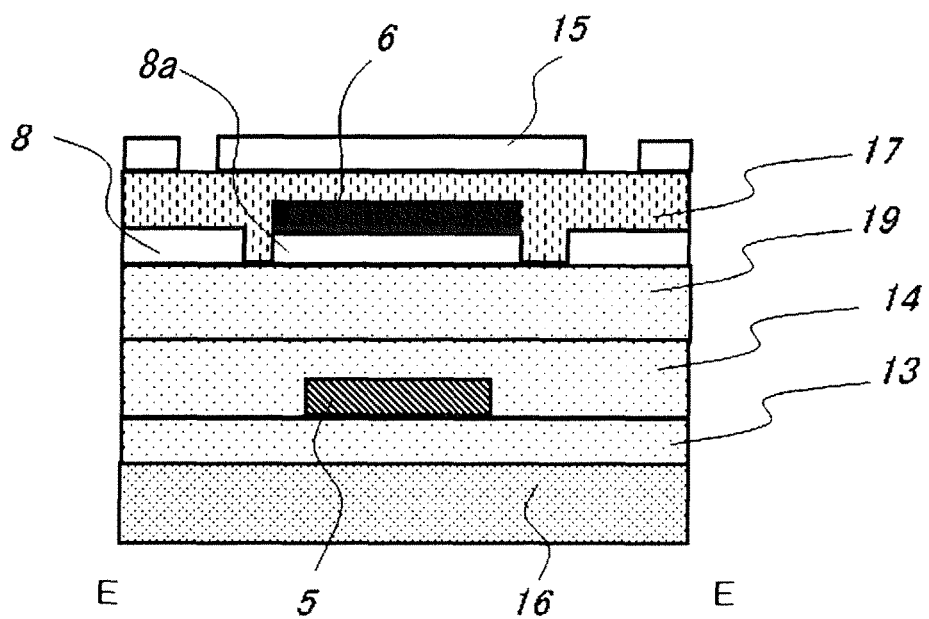
FIG. 11 is a cross-sectional view of a portion taken along the line E-E in FIG. 9 according to a fifth preferred embodiment.

FIG. 11 is a cross-sectional view of a portion taken along the line E-E in FIG. 9 according to a fifth preferred embodiment. Note that, for the sake of avoiding redundancy due to repeated description, components having the same or corresponding functions are denoted by the same reference symbols in the drawings for each of the preferred embodiments.

In the first to third preferred embodiments, description has been given referring to the drawings in which the source wires 5 and the pixel electrode 8, the gate connection lines 6, and the common electrode 15 are each disposed in different layers in the stated order so that all of the components mentioned above are insulated from one another by insulating layers. In the fourth preferred embodiment, description has been given referring to the drawings in which the source wires 5, the pixel electrode 8, the gate connection lines 6, and the common electrode 15 are each disposed in different layers in the stated order so that all of the components mentioned above are insulated from one another by insulating layers. Therefore, insulating films having two layers are formed between the pixel electrode 8 and the common electrode 15 in those drawings, thus finding a problem in which capacity between both the electrodes is reduced.

In this fifth preferred embodiment, the pixel electrode 8 and the gate connection lines 6 are provided on the third interlayer insulating film 19. Therefore, unlike the illustrations of the first to fourth preferred embodiments, the first interlayer insulating film 14 is not formed between the pixel electrode 8 and the common electrode 15, and the thickness of the insulating film can be reduced correspondingly thereto. As a result, it is possible to have storage capacity formed between both the electrodes be sufficient for stabilizing a pixel potential.

<E-2. Manufacturing Process>

Further, in this fifth preferred embodiment, as illustrated in FIG. 11, configuration of forming a transparent conductive film 8a in a lower layer of the gate connection lines 6 may be employed. Here, the transparent conductive film 8a is formed in the same layer as the pixel electrode 8, but is a pattern that is electrically separated from the pixel electrode 8.

Such a structure may be formed through the following process, that is, formed through a process in which a transparent conductive film to be the transparent conductive film 8a and the pixel electrode 8 and a conductive film to be the gate connection lines 6 are formed through stacking, and then an exposure process using a multi-tone exposure mask such as a gray tone mask is applied to an applied photo resist.

Specifically, exposure may be performed such that the thickness of a resist in a region for forming the gate connection lines 6 becomes larger than the thickness of a resist in other regions after development, which is performed after the exposure. After this, a structure illustrated in FIG. 11 can be obtained through a process of finishing into a pattern including the pixel electrode 8 and the transparent conductive film 8a, a process of removing a resist at positions having a small thickness, and a process of removing a conductive film exposed after removing the resist through etching. That is, in the manufacturing method, an effect capable of integrating patterning processes for two different layers into one photolithographic process is attained.

Accordingly, according to the structure of stacking the gate connection lines 6 on the transparent conductive film 8a as illustrated in FIG. 11, a photolithographic process for forming patterns of the gate connection lines 6 and the pixel electrode 8 can be integrated into one process from two processes. Further, take time in manufacture can also be reduced.

Also in this fifth preferred embodiment similarly to the first preferred embodiment, frame-width reduction can be realized in a high-resolution large screen, and a liquid crystal display device of an FFS mode having a high yield rate can be realized.

Further, according to the above-mentioned structure, also in this fifth preferred embodiment similarly to the fourth preferred embodiment, insulating films having two layers of the first interlayer insulating film and the third interlayer insulating film are formed between the source wires 5 and the gate connection lines 6, and hence an effect capable of reducing capacity and a short circuit failure between both the wires can be expected. Further, in this fifth preferred embodiment, time for a manufacturing process can be reduced, and hence a liquid crystal display device of an FFS mode capable of cost reduction can be realized.

In the present invention, the preferred embodiments may be modified and omitted as appropriate within the scope of the invention. For example, similar effects may be attained even when slits are provided in the gate connection lines 6 or the source wires 5 as in the second or third preferred embodiment.

F. Sixth Preferred Embodiment

Figure 12:
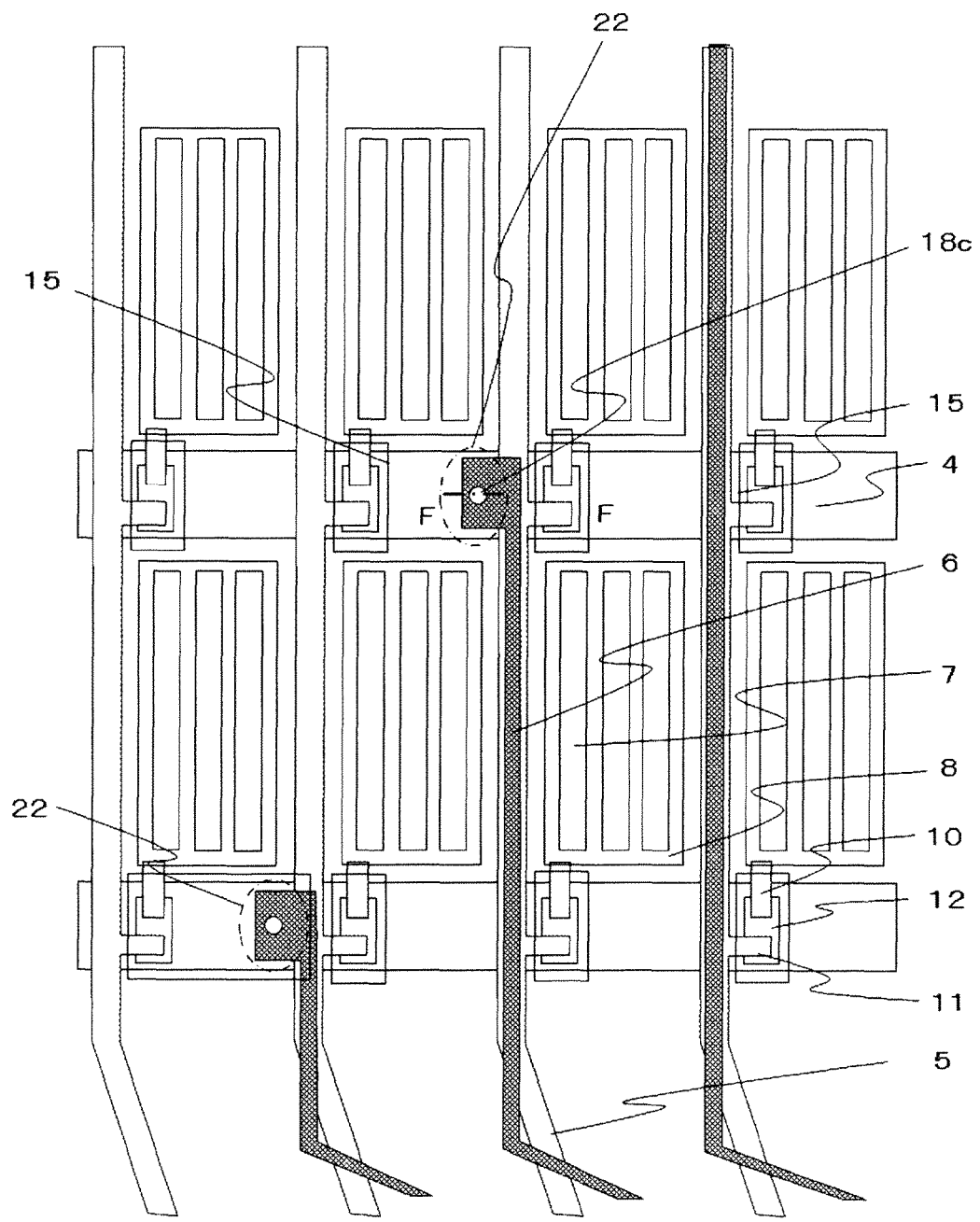
FIG. 12 is a plan view of a liquid crystal display panel according to a sixth preferred embodiment.
Figure 13:
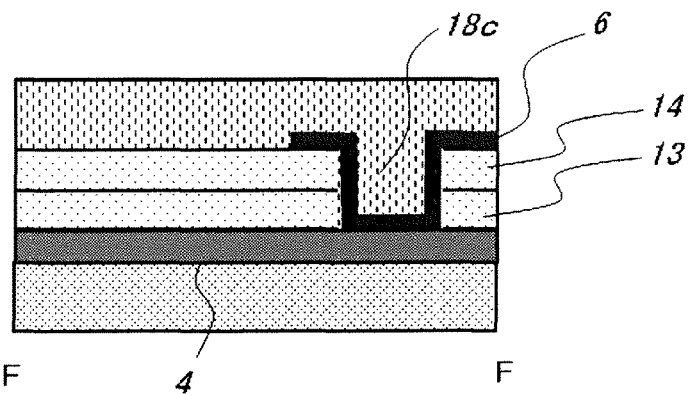
FIG. 13 is a cross-sectional view of a portion taken along the line F-F in FIG. 12.

FIG. 12 is an enlarged plan view of the region A of FIG. 1 according to a sixth preferred embodiment, and FIG. 13 is a cross-sectional view of a portion taken along the line F-F in FIG. 12. Note that, for the sake of avoiding redundancy due to repeated description, components having the same or corresponding functions are denoted by the same reference symbols in the drawings for each of the preferred embodiments.

In the first preferred embodiment, as illustrated in FIG. 4, description has been given of a mode in which the gate connection lines 6 and the gate wires 4 are electrically connected to each other through the contact holes 18a and 18b formed in each insulating film in the connection portion 22, and the connection film 15a.

A gate signal is applied to the connection film 15a. However, in a case where the connection film 15a is formed in the uppermost layer as illustrated in FIG. 4, orientation of liquid crystals in the vicinity of the connection film 15a may be disturbed due to a voltage of the applied gate signal. Further, the disturbance may influence to generate failures that deteriorate display quality, such as light leakage. A structure of further applying cover with an insulating film only as a countermeasure therefor may be assumed, but this causes increase in manufacturing cost.

In view of the above, as illustrated in FIG. 13, the sixth preferred embodiment employs a structure in which a third contact hole 18c passing through the gate insulating film 13 and the first interlayer insulating film 14 that are provided between the gate wires 4 and the gate connection lines 6 is opened in a region where the gate wires 4 and the gate connection lines 6 are overlapped with each other, thereby bringing the gate wires 4 and the gate connection lines 6 into direct contact with each other. Further, in the connection portion 22, the contact hole 18c and the gate connection lines 6 are covered by the second interlayer insulating film 17.

According to the above-mentioned structure, similar effects to those of the first preferred embodiment can be expected and a conductive film having a potential of a gate signal is covered by an insulating film, and hence a liquid crystal display device of an FFS mode capable of suppressing deterioration in display quality can be realized. Further, this sixth preferred embodiment is applicable together with the first to fifth preferred embodiments.

In the present invention, the preferred embodiments may be modified and omitted as appropriate within the scope of the invention. For example, when this preferred embodiment is applied to the fourth or fifth preferred embodiment, the third contact hole 18c is opened in insulating films of, in addition to the gate insulating film 13 and the first interlayer insulating film 14, the third interlayer insulating film 19 as well.

G. Seventh Preferred Embodiment

FIG. 2 referred for the description of the first preferred embodiment is an illustration in which one gate connection line 6 is formed so as to be overlapped with one source wire 5 up to the position of the connection portion 22 electrically connected to the gate wire 4.

When the size of the display region 1 is increased in such a configuration, the overlapping length of the gate connection line 6 and the source wire 5 is also proportionally increased, thereby also increasing capacity formed between both the wires. In general, increase in capacity leads to increase in a relaxation time in transient response characteristics. Therefore, in a liquid crystal display device, it is difficult to make a potential of the source wire reach a desired potential during a horizontal scanning period (period for selecting one gate line) from the time when a signal potential is input into the source wire.

Further, higher resolution requires more number of gate wires and reduces the horizontal scanning period (period for selecting one gate line), and thus the above-mentioned problem becomes more serious. As a result, constraint (upper limit) is generated upon the possible size of the display region to which the first preferred embodiment is applied.

Meanwhile, the display region 1 has both of a region in which the gate connection lines 6 are arranged in a pixel and a region in which the gate connection lines 6 are not arranged in a pixel. Therefore, the above-mentioned problem may be generated only in a region including more pixels having the gate connection lines 6. That is, only the region including more pixels having the gate connection lines 6 may come short of a potential of the source wire to reduce a voltage to be applied to liquid crystals, which may cause reduction in transmittance to generate display unevenness.

This seventh preferred embodiment has its feature in that one gate connection line having a region overlapped with one source wire is disposed so as to be bent to extend in a direction along the gate wire and have a region overlapped also with an adjacent source wire.

Figure 14:
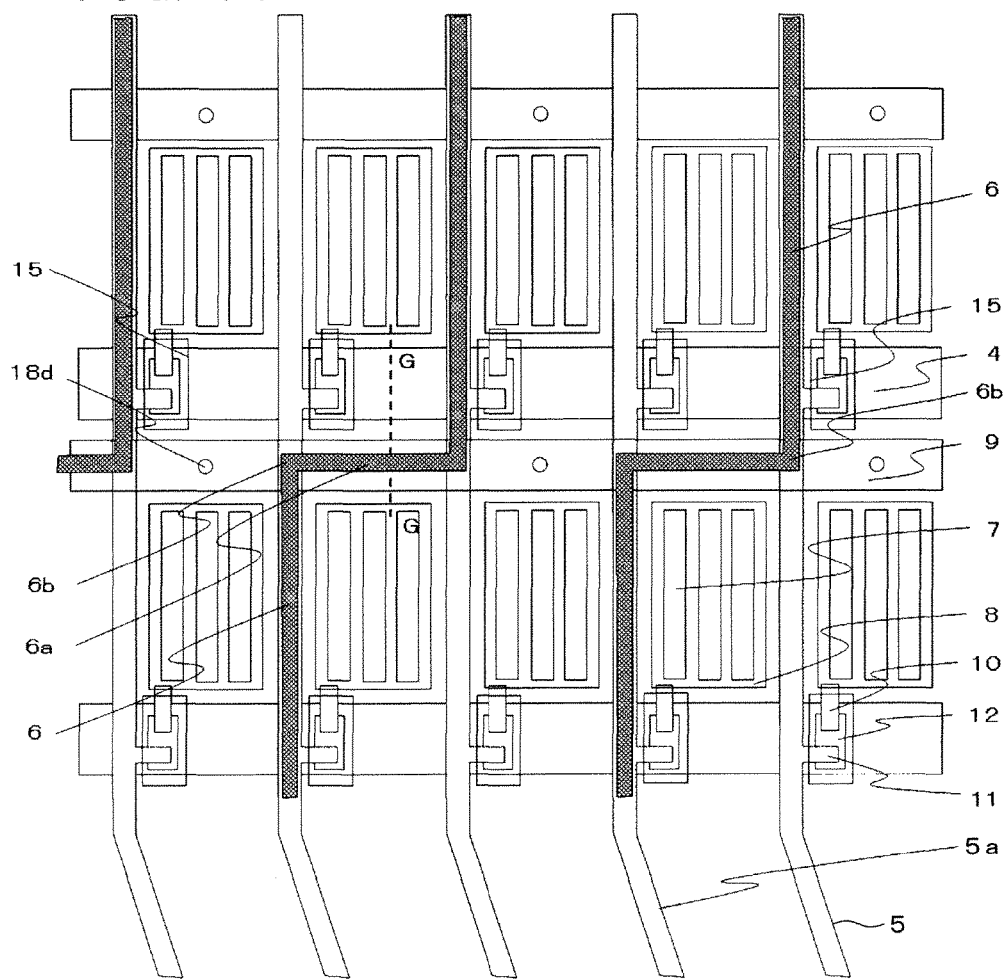
FIG. 14 is a plan view of a liquid crystal display panel according to a seventh preferred embodiment.
Figure 15:
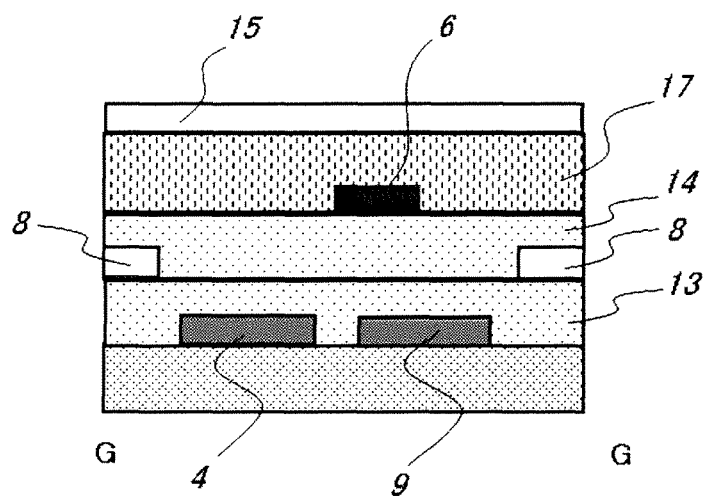
FIG. 15 is a cross-sectional view of a portion taken along the line G-G in FIG. 14.

Now, further detailed description is given of this seventh preferred embodiment. FIG. 14 is a plan view according to the seventh preferred embodiment, which corresponds to an enlarged plan view of a region corresponding to the region B in FIG. 1. FIG. 15 is a cross-sectional view of a portion taken along the line G-G in FIG. 14. Note that, for the sake of avoiding redundancy due to repeated description, components having the same or corresponding functions are denoted by the same reference symbols in the drawings for each of the preferred embodiments. Further, FIG. 14 omits illustration of connection portions for clearly illustrating the features of this preferred embodiment, but the above-mentioned connection portions are provided as appropriate also in this preferred embodiment.

As illustrated in FIG. 14, the gate connection line 6 formed on one source wire 5 has an extending portion 6a extending in a direction along the gate wire 5 or a Cs wire 9 and a bent portion 6b for changing the direction of the wire therefor, and has a region overlapped also with another source wire 5a that is adjacent to the above-mentioned one source wire 5.

Here, the Cs wire 9 is a wire having the same potential as the common electrode 15, and is a low-resistance wire contributing to application of a uniform common potential to an entire surface of the common electrode 15 in the display region 1. Therefore, the Cs wire 9 has a connection portion between the Cs wire 9 and the common electrode 15 as appropriate, and a contact hole 18d being a third contact hole is illustrated as the connection portion. Although a cross-sectional view is not shown, when the Cs wire 9 is in the same layer as the gate wire, the contact hole 18d is formed to be opened at least in the gate insulating film, the first interlayer insulating film, and the second interlayer insulating film.

Further, the gate connection line 6 extends in the display region 1 so as to have the extending portion 6a extending in a direction along the gate wire 5 or the Cs wire 9 at at least one position, and the bent portion 6b therefor. As illustrated in FIG. 14, however, the extending portion 6a may be overlapped with the Cs wire 9. Although not shown, the extending portion 6a of the gate connection line 6 may be overlapped with the gate wire 4. According to such structures in which the wires are overlapped with one another, reduction in an aperture ratio in a pixel can be suppressed. Note that, in a case where the extending portion 6a is overlapped with the gate wire 4, the Cs wire 9 need not be provided necessarily.

According to such a configuration, an effect capable of setting the overlapping length of the gate connection line 6 and the source wire 5 to be uniform between the source wires 5 is attained. Accordingly, both of reduction of unevenness in capacity between the gate connection lines and the source wires and a uniform arrival time of a source potential are realized. With this, an applicable size of the display region can be further increased in this seventh preferred embodiment than in the first preferred embodiment.

In FIG. 14, a mode in which one gate connection line 6 is disposed so as to have a portion overlapped with two source wires 5 is illustrated, but the number of the source wires 5 overlapped by one gate connection line 6 may be increased to three or more through further addition of the bent portion 6b. That is, the number of the source wires 5 overlapped by one gate connection line 6 may be at least two or more.

Further, all of the gate connection lines 6 in the display region 1 may have the extending portion 6a and the bent portion 6b. Alternatively, the gate connection lines 6 as illustrated in FIG. 14 and other gate connection lines without extending portions or bent portions may exist in a mixed manner. Such modes enable further finer uniformization, and hence an applicable size of the display region can be further increased.

In the present invention, the preferred embodiments may be modified and omitted as appropriate within the scope of the invention. For example, similar effects may be attained even when slits are provided in the gate connection lines 6 or the source wires 5 as in the second or third preferred embodiment.

H. Eighth Preferred Embodiment

Figure 16:
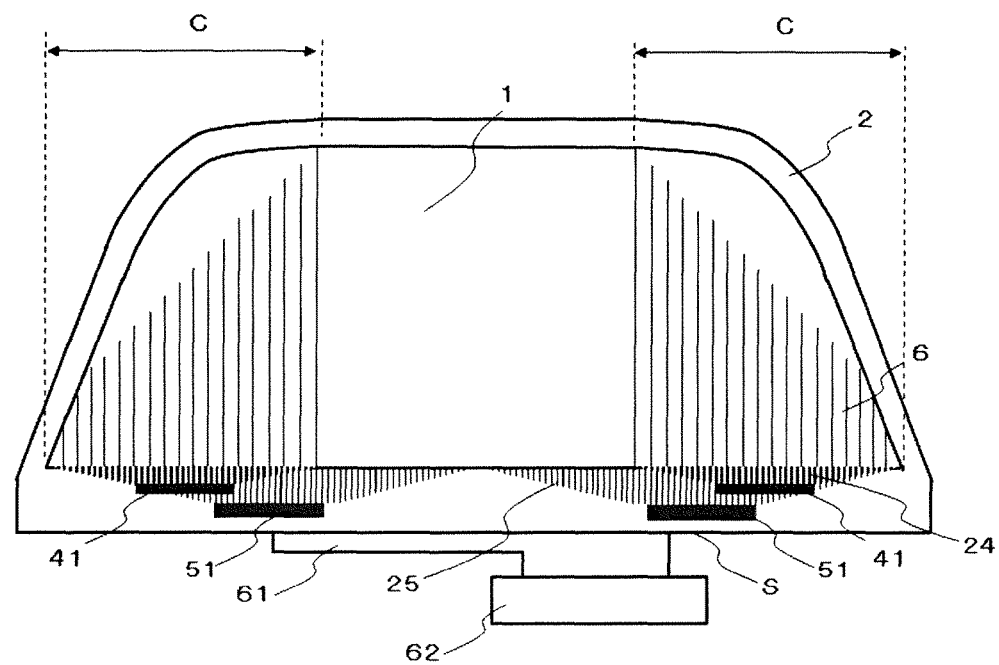
FIG. 16 is a plan view of a liquid crystal display panel according to an eighth preferred embodiment.

In the first to seventh preferred embodiments, description has been given of a case where the display region is a rectangular shape, but the shape of the display region is not to be limited to a rectangular shape. FIG. 16 is a plan view of a liquid crystal display panel according to an eighth preferred embodiment. Note that, the illustration of the gate wires and the source wires is omitted in FIG. 16, but similar arrangement to FIG. 2 is employed also in this preferred embodiment.

The shape of the display region 1 of the liquid crystal display panel is substantially a trapezoidal shape, in which portions from both lateral legs toward an upper side of the trapezoidal shape are gently curved. The frame region 2 is a region surrounding the periphery of the display region 1, and has a shape reflecting the shape of the display region 1. In the frame region 2, the gate ICs 41 and the source ICs 51 are mounted on the side S side corresponding to a bottom side of the substantial trapezoidal shape.

Further, in regions of the substantial trapezoidal shape where the bottom side extends beyond the upper side, regions C having a substantially triangular shape exist at two positions, that is, at lateral ends of the display region 1. As illustrated in FIG. 16, the gate connection lines 6 formed in the regions C at two lateral end portions in the display region 1 are connected to one gate IC 41 in each of the regions. That is, mounting positions for the gate ICs 41 are provided at two positions correspondingly to the regions C provided at the two lateral positions.

In the first preferred embodiment, description has been given taking an example of a mode in which only one gate IC is mounted, but a mode as illustrated in FIG. 16 may be employed. The same applies even when the shape of the display region is a rectangular shape, a substantially trapezoidal shape, or a semicircular shape having a straight portion in the side S for mounting. In any of the cases, the gate ICs may be mounted at two lateral positions as illustrated in FIG. 16.

In the present invention, the preferred embodiments may be modified and omitted as appropriate within the scope of the invention. For example, the gate IC may be provided in the central portion of the side S and the source ICs may be mounted on both lateral sides thereof.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display panel of an FFS mode comprising:
    a first substrate and a second substrate that are arranged so as to be opposed to each other;
    liquid crystal sealed between the first substrate and the second substrate; and
    a display region in which an image is displayed and a frame region being a peripheral region of the display region, wherein, the first substrate comprises:
an insulating substrate;
a plurality of gate wires provided on the insulating substrate;
a plurality of source wires provided on the insulating substrate with intermediation of a first insulating film so as to intersect with the plurality of gate wires;
a first interlayer insulating film formed in an upper layer of the plurality of source wires;
a second interlayer insulating film formed in an upper layer of the first interlayer insulating film;
a switching element provided in a vicinity of an intersection position of one of the plurality of gate wires and one of the plurality of source wires;
a transparent pixel electrode connected to the switching element;
a transparent common electrode provided with intermediation of the first interlayer insulating film between the transparent common electrode and at least one of the plurality of source wires, and provided with intermediation of the second interlayer insulating film between the transparent common electrode and the transparent pixel electrode and having a slit of the transparent common electrode;
a plurality of gate connection lines being a different layer from the plurality of gate wires and the plurality of source wires, the plurality of gate connection lines extending while intersecting with the plurality of gate wires; and
a connection portion provided in the display region, the connection portion electrically connecting at least one of the plurality of gate wires and at least one of the plurality of gate connection lines,
each of the plurality of gate wires has the connection portion at at least one position, and
at least one of the plurality of gate connection lines has a region overlapped with at least one of the plurality of source wires.

2. The liquid crystal display panel according to claim 1, wherein at least one of the plurality of gate connection lines is formed in an upper layer with respect to at least one of the plurality of source wires and in a lower layer with respect to the transparent common electrode.

3. The liquid crystal display panel according to claim 1, wherein at least one of the plurality of gate connection lines has a gate connection line slit having a region overlapped with at least one of the plurality of source wires.

4. The liquid crystal display panel according to claim 3, wherein a width of at least one of the plurality of gate connection lines is larger than a width of at least one of the plurality of source wires, and at least one of the plurality of gate connection lines is not overlapped with the slit of the transparent common electrode.

5. The liquid crystal display panel according to claim 1, wherein at least one of the plurality of source wires has a source wire slit having a region overlapped with at least one of the plurality of gate connection lines.

6. The liquid crystal display panel according to claim 1, wherein at least one of the plurality of source wires and the transparent pixel electrode are in the same layer.

7. The liquid crystal display panel according to claim 1, wherein at least one of the plurality of source wires and at least one of the plurality of gate connection lines are formed in different layers with intermediation of stacking insulating films including the first interlayer insulating film.

8. The liquid crystal display panel according to claim 7, wherein at least one of the plurality of source wires and the transparent pixel electrode are formed in different layers with intermediation of the first interlayer insulating film.

9. The liquid crystal display panel according to claim 7, wherein at least one of the plurality of gate connection lines and the transparent pixel electrode are in the same layer.

10. The liquid crystal display panel according to claim 9, wherein a transparent conductive film that is made of the same material as a material of the transparent pixel electrode and is electrically separated from the transparent pixel electrode and at least one of the plurality of gate connection lines are stacked.

11. The liquid crystal display panel according to claim 1, wherein, in the connection portion,
a first contact hole is formed, the first contact hole being opened at least in the first insulating film, the first interlayer insulating film, and the second interlayer insulating film that are provided on at least one of the plurality of gate wires,
a second contact hole is formed, the second contact hole being opened in the second interlayer insulating film provided on at least one of the plurality of gate connection lines, and
a connection film is formed, the connection film being formed in an upper layer with respect to the second interlayer insulating film and connecting at least one of the plurality of gate wires and at least one of the plurality of gate connection lines through the first contact hole and the second contact hole.

12. The liquid crystal display panel according to claim 11, wherein the connection film is made of the same material as a material of the transparent common electrode, and is a transparent conductive film electrically separated from the transparent common electrode.

13. The liquid crystal display panel according to claim 1, wherein the second interlayer insulating film covers the connection portion.

14. The liquid crystal display panel according to claim 13, wherein,
in the connection portion, at least one of the plurality of gate wires and at least one of the plurality of gate connection lines have a region to be overlapped with each other, and
in the overlapped region, at least one of the plurality of gate wires and at least one of the plurality of gate connection lines are connected to each other through a third contact hole that is opened at least in the first insulating film and the first interlayer insulating film.

15. The liquid crystal display panel according to claim 1, wherein at least one of the plurality of gate connection lines has, at at least one position in the display region, an extending portion extending in a direction parallel to at least one of the plurality of gate wires.

16. The liquid crystal display panel according to claim 15, wherein, in the plurality of gate connection lines, at least one of the plurality of gate connection lines having the extending portion and at least one of the plurality of gate connection lines without the extending portion exist in a mixed manner.

17. The liquid crystal display panel according to claim 1, wherein at least one of the plurality of gate wires is electrically connected to the plurality of gate connection lines.

18. The liquid crystal display panel according to claim 1, wherein a gate IC for outputting a gate signal to at least one of the plurality of gate wires via at least one of the plurality of gate connection lines and a source IC for outputting an image signal to at least one of the plurality of source wires are mounted on the same one side of the first substrate.

19. A liquid crystal display device comprising:
the liquid crystal display panel of claim 1;
an optical sheet;
a light source; and
a housing.

* * * * *